United States Patent
Fry et al.

(10) Patent No.: US 10,796,544 B2
(45) Date of Patent: *Oct. 6, 2020

(54) CONCEALED ITEM DETECTION WITH IMAGE SERIES IN EULERIAN AND LAGRANGIAN FRAME OF REFERENCE

(71) Applicant: The Government of the United States of America, as represented by the Secretary of Homeland Security, Washington, DC (US)

(72) Inventors: Mark A. Fry, Atlantic City, NJ (US); Barry T. Smith, Atlantic City, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,168

(22) Filed: Dec. 20, 2019

(65) Prior Publication Data

US 2020/0143646 A1 May 7, 2020

Related U.S. Application Data

(63) Continuation of application No. 16/260,801, filed on Jan. 29, 2019, now Pat. No. 10,553,093, which is a continuation of application No. 15/475,798, filed on Mar. 31, 2017, now Pat. No. 10,210,730.

(51) Int. Cl.
*G08B 13/196* (2006.01)
*H04N 7/18* (2006.01)
*G06K 9/00* (2006.01)
*G06T 7/70* (2017.01)
(Continued)

(52) U.S. Cl.
CPC .... *G08B 13/19697* (2013.01); *G06K 9/00771* (2013.01); *G06T 5/20* (2013.01); *G06T 7/20* (2013.01); *G06T 7/70* (2017.01); *H04N 7/183* (2013.01); *H04N 7/188* (2013.01)

(58) Field of Classification Search
None
See application file for complete search history.

(56) References Cited

U.S. PATENT DOCUMENTS

| | | |
|---|---|---|
| 9,213,817 B2 | 12/2015 | Chatterton |
| 9,418,279 B2 | 8/2016 | Krishnamoorthi |
| 10,037,609 B2 | 7/2018 | Chen et al. |

(Continued)

*Primary Examiner* — Christopher G Findley
(74) *Attorney, Agent, or Firm* — Lavanya Ratnam; Kelly G. Hyndman; William Washington

(57) ABSTRACT

A method to analyze video includes obtaining an image series in an Eulerian or Lagrangian frame of reference, selecting one or more specific regions of interest and extracting to remove irrelevant motion and/or noise, decomposing the extracted images into a plurality of frequency bands and extracting a pixel value time series corresponding to the values of a pixel in each spatial frequency band, magnifying the pixel value time series to obtain a magnified pixel value time series, adding the magnified pixel value time series to the pixel value time series to generate a superimposed pixel value time series, and applying a spatial reconstruction to the superimposed pixel value time series to generate an output image series. A system to perform this method is also provided.

14 Claims, 4 Drawing Sheets

(51) Int. Cl.
   *G06T 5/20*      (2006.01)
   *G06T 7/20*      (2017.01)

(56) References Cited

U.S. PATENT DOCUMENTS

| | | |
|---|---|---|
| 10,210,730 B2 * | 2/2019 | Fry et al. .............. G08B 13/196 |
| 10,553,093 B2 * | 2/2020 | Fry et al. .............. G08B 13/196 |
| 2005/0286774 A1 | 12/2005 | Porikli |
| 2014/0072190 A1 | 3/2014 | Wu et al. |
| 2015/0195430 A1 | 7/2015 | Wadhwa et al. |
| 2016/0267664 A1 | 9/2016 | Davis et al. |

* cited by examiner

CONCEALED ITEM DETECTION WITH IMAGE SERIES IN EULERIAN AND LAGRANGIAN FRAME OF REFERENCE

CROSS-REFERENCE TO RELATED APPLICATIONS

This application is a Continuation of U.S. application Ser. No. 16/260,801, filed Jan. 29, 2019, now U.S. Pat. No. 10,553,093, which is a Continuation of U.S. application Ser. No. 15/475,798, filed Mar. 21, 2017, now U.S. Pat. No. 10,210,730, the contents of all of which are hereby incorporated by reference in their entirety.

BACKGROUND

The present disclosure relates generally to the detection of forbidden items that may be concealed by travelers, or personnel in areas under security control, such as public transportation, public areas, and entrances to public or government buildings.

The detection of dangerous items that may pose a threat for security, e.g. firearms, explosives or knives, is probably the most crucial part of many security programs. Such detection is particularly relevant for situations where there is an intense circulation of persons inside a confined area and where these dangerous items may easily be hidden under clothing, such as the traffic of travelers carrying coats and/or jackets through an airport security checkpoint.

Having an efficient and reliable way to detect concealed items during periods of intense traffic of persons can be extremely difficult.

Radiographic screenings, utilizing technologies such as x-ray backscatter and millimeter wave scanning, have long been known and widely used to make detection of concealed items possible.

While radiographic images resulting from radiographic screening provides a way to detect concealed items carried by the travelers, radiographic screenings rely on heavy machineries, require screening of the travelers one by one, and in most circumstances the person must stop for a screening. All of which may be time and cost consuming.

Thus, a security system and a method to detect concealed items solving the aforementioned limitations is desired.

SUMMARY

Accordingly, the object of the present disclosure is to provide a security system and a method to detect concealed items, which overcomes the above-mentioned limitations. The security system and the method of the present disclosure address the limitation of efficiency by providing a process to analyze videos of people and magnify small motions generated by the concealed item that would be otherwise undetectable through the naked eye.

In one non-limiting illustrative example, a security system to detect a concealed item is presented. The security system to detect a concealed item includes a camera configured to capture an image series of the traveler (i.e., an image collection device) in an Eulerian or Lagrangian frame of reference, wherein the captured image series contains motions generated by the concealed item; an alarm system configured to produce an alert signal; and an electronic control unit. The electronic control unit is configured to magnify motions generated by the concealed item (i.e., by the moving object) to generate perceptible motions, provide an output image series that contains the perceptible motion, detect characteristic kinematic behaviors of the concealed item from the output image series, measure characteristic kinematic quantities of the characteristic kinematic behaviors, determine a presence of the concealed item from the characteristic kinematic quantities, and activate the alarm system to produce the alert signal.

In another non-limiting illustrative example, a method to detect a concealed item is presented. The method to detect a concealed item includes: capturing an image series of the traveler, via a camera, wherein the captured image series contains motions generated by the concealed item; magnifying the motions generated by the concealed item to generate perceptible motions, via the processing circuitry; providing an output image series that contains the perceptible motion, via the processing circuitry; detecting characteristic kinematic behaviors of the concealed item from the output images series, via the processing circuitry; measuring characteristic kinematic quantities of the characteristic kinematic behaviors, via processing circuitry; determining a presence of the concealed item from the characteristic kinematic quantities, via the processing circuitry; and producing an alert signal via an alarm system.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
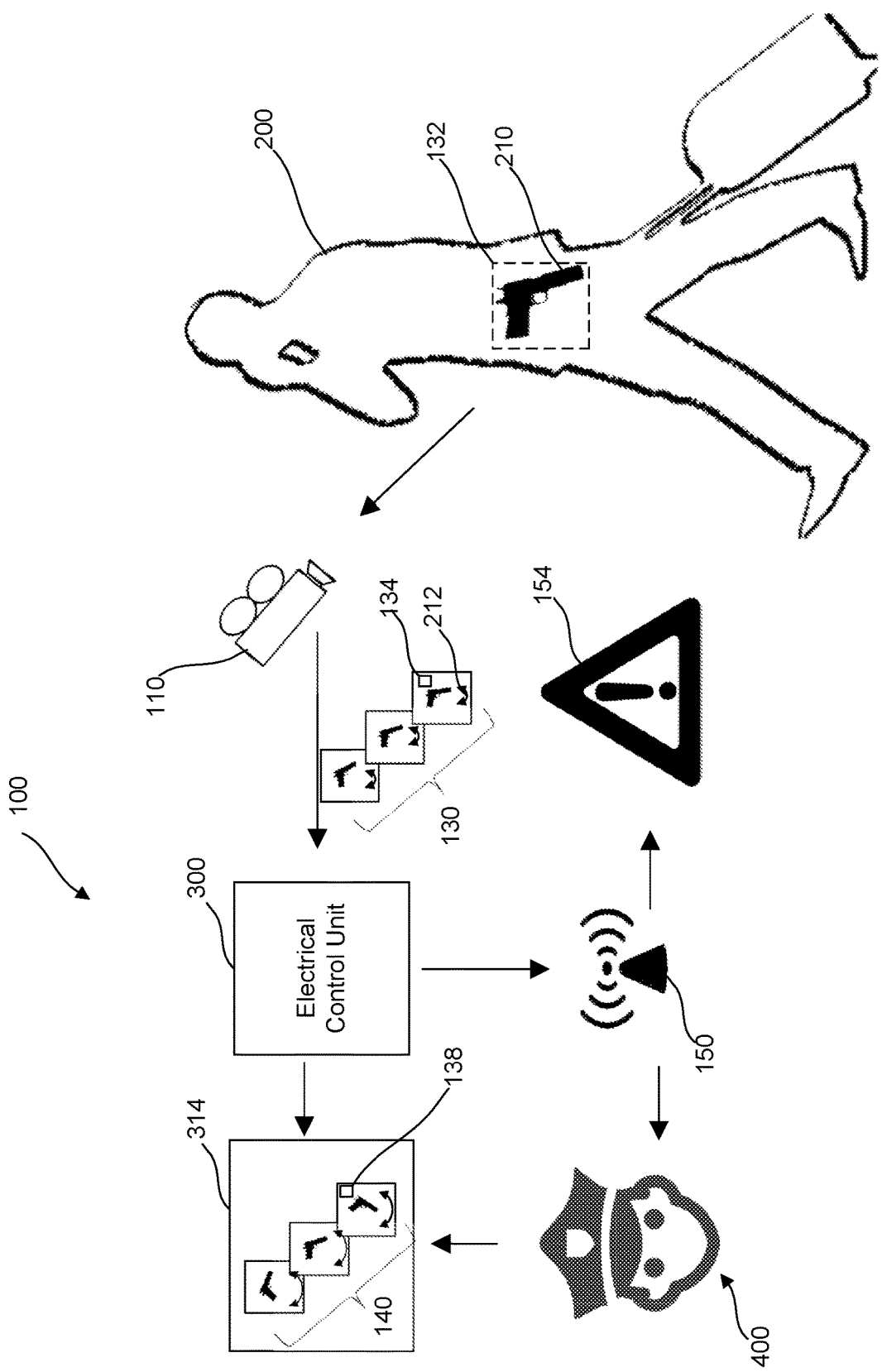
FIG. 1 is a schematic view of a security system to detect a concealed item carried by a traveler, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a schematic view of a security system 100 to detect a concealed item 210 carried by a traveler 200, according to certain aspects of the disclosure.

The security system 100 may include a camera 110, an electronic control unit 300, and an alarm system 150. The camera 110 may capture input image series 130 of the traveler 200 in motion. The input image series 130 may be collections of images captured successively in time, e.g. standard videos, of the traveler 200 in motion, e.g. walking or running.

The input image series 130 may be captured via an Eulerian frame of reference and/or a Lagrangian frame of reference. In the Eulerian frame of reference, the traveler 200 passes through a field of view of the camera 110 that is fixed, i.e., a fixed field of view. For example, the camera 110 may be affixed to a ground surface on which the traveler 200 is walking. In the Lagrangian frame of reference, the field of view moves with the traveler 200. For example, the camera 110 may be motorized to follow displacement of the traveler 200 e.g. to follow the traveler 200 as he/she is in motion.

The electronic control unit 300 may receive the input image series 130 from the camera 110 and apply a detection method S100 to the input image series 130 in order to reveal the presence of the concealed item 210, as described in further detail below with regard to FIGS. 2 and 3.

The detection method S100 may include extracting small motions 212 generated by the concealed item 210 carried on the traveler 200, e.g. motions with low spatial displacements that are not directly perceptible by the naked eye, and magnifying the small motions 212 via a magnification method S140 to extract characteristic kinematic behaviors and kinematic quantities of the small motions 212. For example, the characteristic kinematic behaviors may be rigid body motions such as rigid body rotations and/or translations and the kinematic quantities may be the moments generated by the rigid body motions. For example, a rigid body such as a concealed object may be revealed by an outline on the overlaying garment, the constrained motion of the overlaying garment, or an unnatural draping of the garment.

The concealed item 210 carried by the traveler 200 may be any item or object that may pose a threat for security, e.g. a weapon or an explosive, and that is prevented from being seen with an outer garment. For example, the concealed item 210 may be a handgun carried on a belt and covered by a shirt of the traveler 200.

The alarm system 150 may be activated by the electronic control unit 300 to provide an alert signal 154 that indicates a presence of the concealed item 210 on the traveler 200.

The alert signal 154 may be an acoustic signal produced by sirens and/or speakers of the electronic control unit 300, a visual signal produced by light sources, and/or the combination of acoustic, visual and written messages produced by processing circuitry of the electronic control unit 300 and displayed on a monitor 314 of the electronic control unit 300.

Alternatively, the alert signal 154 may be messages containing information about the traveler 200, e.g. pictures of the traveler 200 sent to authorities 400 responsible for the security of travelers. For instance, the authorities 400 may correspond to any group of persons enforcing security at a security checkpoint, such as agents of Transportation Security Administration (TSA).

The alert signal 154 may be sent directly and confidentially to the authorities 400 through a network 390, such as the Internet or a local intranet, via a network interface 326 of the electronic control unit 300.

In addition, the alarm system 150 may be peripheral to or part of the electronic control unit 300.

Figure 2:
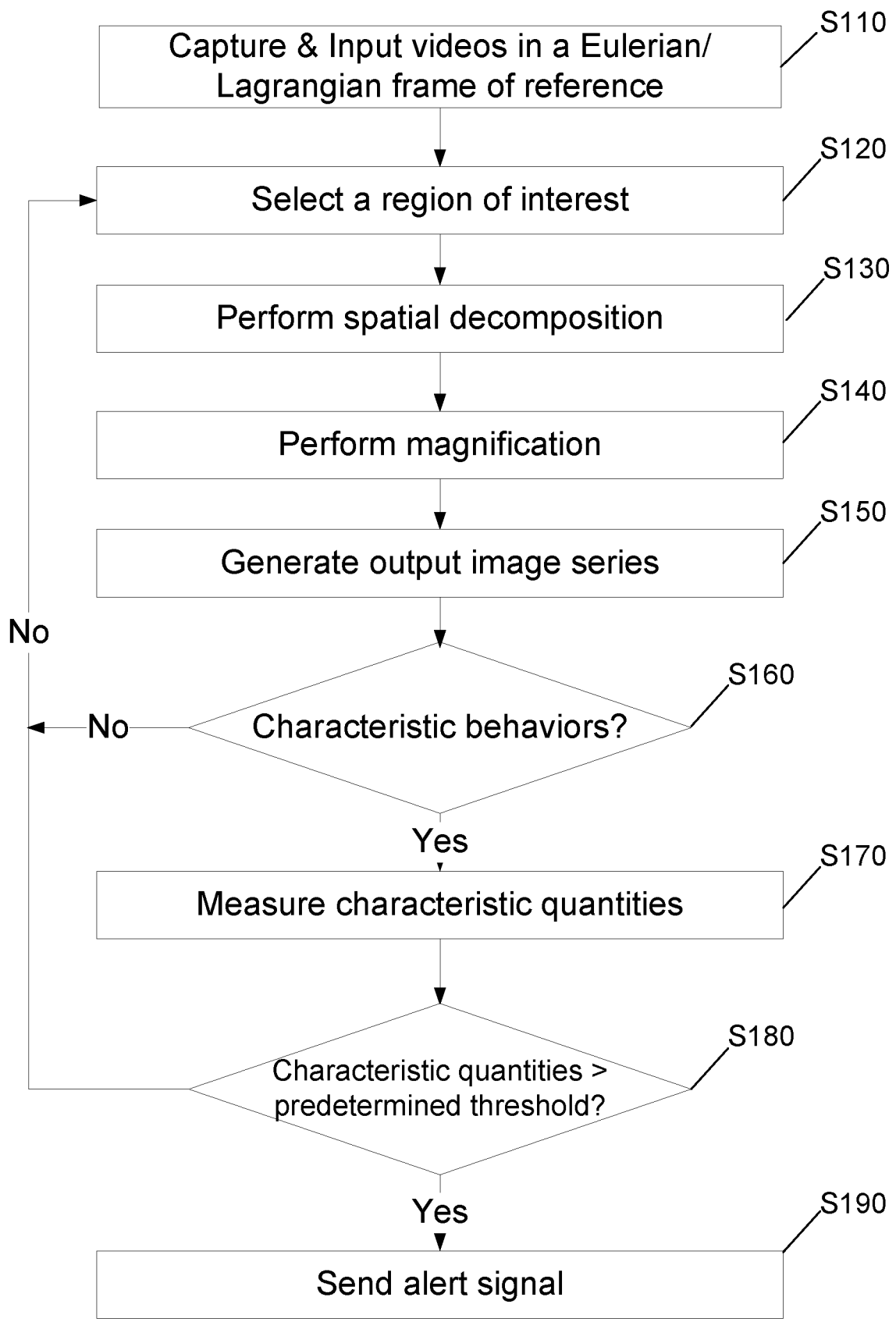
FIG. 2 is a flow chart of a detection method to detect the concealed item carried by the traveler, according to certain aspects of the disclosure.

FIG. 2 is a flow chart of the detection method S100 for revealing the presence of the concealed item 210 carried by the traveler 200, according to certain aspects of the disclosure.

In a step S110, the electronic control unit 300 receives the input image series 130 of the traveler 200 captured by the camera 110.

The input image series 130 may be captured at a predetermined frame rate Fr and with a predetermined resolution R, wherein the predetermined frame rate Fr and the predetermined resolution R are sufficiently high to substantially capture the small motions 212 produced by the concealed item 210. Frame rates of 30 frames per second are baseline but information obtained from higher speeds can be overlaid to provide areas of time resolution. Frame rates of hundreds of frames per second are used to obtain data for humans walking at a few miles per hour to provide millimeter resolution in space e.g. Fr=400 Hz. The predetermined resolution R may correspond to a number of pixels sufficiently high to completely sample the concealed item 210, e.g. R=640×480 pixels.

In addition, the input image series 130 may be captured via the Eulerian frame of reference or via the Lagrangian frame of reference in step S110.

In a step S120, for each image contained in the input image series 130, a specific region of interest 132 is selected and extracted in order to remove irrelevant motions and/or irrelevant noise that may perturb the application of the detection method S100. For example, irrelevant motions or noises may include untargeted objects and/or travelers. The specific region of interest 132 may correspond to a sensitive zone and/or part of the traveler 200 where the concealed item 210 may be carried, e.g. a waist, legs, armpits, or forearms of the traveler 200.

The step S120 may be performed manually via the authorities 400 or automatically via software instructions executed by a processor 302 including processing circuitry inside the electronic control unit 300. For example, the authorities 400 may select a group of pixels for each image of the input image series 130 via a command/instruction interface of the electronic control unit 300, or the software instructions may apply a digital mask to each image of the input image series 130.

In a step S130, the input image series 130 is decomposed into a plurality of spatial frequency bands. Then, the pixel value time series 134 corresponding to values of a pixel in each spatial frequency band of the plurality of spatial frequency bands is extracted.

The step S130 may be performed automatically via software instructions executed by the processor 302 including processing circuitry inside the electronic control unit 300. For example, the software instructions may rely on image processing tools, such as fast Fourier transforms.

In a step S140, the magnification method S140 is applied to the pixel value time series 134 in order to obtain magnified pixel value time series 138 by constructing and implementing a temporal filter and a magnification function α to the pixel value time series 134. The construction of the temporal filter and the magnification function α may be performed by selecting from a library different types of filters, and different types of amplification function α. The different types of filters may include Gaussian filters, first-order low pass Infinite Impulse Response (IIR) filters, comparison filters of adjacent areas, spatial filters, or symmetry comparisons of the image. The different types of magnification function α may include step functions, or exponential functions, wherein the library is stored in a memory 304 of the electronic control unit 300. The step S140 is described in further details in FIG. 3, which depicts the magnification method to magnify small motions 212 produced by the concealed item 210, and the following paragraphs.

In a step S150, the magnified pixel value time series 138 is added to the pixel value time series 134 to generate a super imposed pixel value time series. An output image series S150 is generated by applying a spatial reconstruction, e.g. inversion of the spatial decomposition performed in the step S130, to the super imposed pixel value time series.

The step S150 may be performed automatically via software instructions executed by the processor 302 including processing circuitry inside the electronic control unit 300. For example, the software instructions may rely on inverse fast Fourier transform.

In a step S160, it is determined if the concealed item 210 displays characteristic kinematic behaviors, e.g., rigid body motions, or asymmetric motions.

If it is determined in step S160 that the concealed item 210 does not display the characteristic kinematic behaviors, the process goes back to the step S120 to select a different region of interest. Otherwise, the process continues to a step S170.

The detection of the characteristic behaviors may be performed manually via the authorities 400 and/or automatically via software instructions executed by the processor 302 including processing circuitry inside the electronic control unit 300. For example, the authorities 400 may visually analyze the output image series 140 displayed on the monitor 314 via the naked eye and/or the software instructions may perform analysis on the output image series 140 to detect and track in time a group of connected pixels that displays the characteristic kinematic behaviors.

In the step S170, characteristic quantities associated with the characteristic behaviors are measured such as a moment of the rigid body motion τ. The measurement of the characteristic quantities may be performed automatically via software instructions executed by the processor 302 including processing circuitry inside the electronic control unit 300. For example, the software instructions may calculate the moment of the rigid body motion τ associated to the group of connected pixels that has been tracked in time in the step S160. Pre-computed models that provide kinematic markers obtained from previously completed person-object walking models may also be used to assess kinematic behaviors.

In a step S180, it is determined if the characteristic behaviors are sufficiently important to represent a threat to security by comparing the characteristic quantities that had been measured in the step S170 to predetermined threshold values. For example, the rigid body motion is determined to pose a threat for security if the moment of the rigid body motion τ is higher than a predetermined torque threshold value τ0.

If it is determined that the characteristic kinematic behavior are sufficiently important to represent a threat for the security in step S180, the process goes to a step S190. Otherwise, the process goes back to the step S110 to receive a next one of the input image series 130.

In the step S190, a command to produce the alert signal 154 is sent by the electronic control unit 300 to the alarm system 150.

In addition, software instructions may be executed by the electronic control unit 300 to directly and confidentially send the alert signal 154 to the authorities 400 via the network interface 326 of the electronic control unit 300.

The region of interest 132 may be divided into a plurality of sub-regions, wherein each sub-region may be iteratively and individually processed from the step S130 to the step S180 via software instructions executed by the processor 302 including processing circuitry inside the electronic control unit 300. Alternatively, all the sub-regions of the plurality of sub-regions may be simultaneously processed from the step S130 to S180 by using at least one graphic processing unit or processing circuitry of the electronic control unit 300 in a parallel computing configuration.

Figure 3:
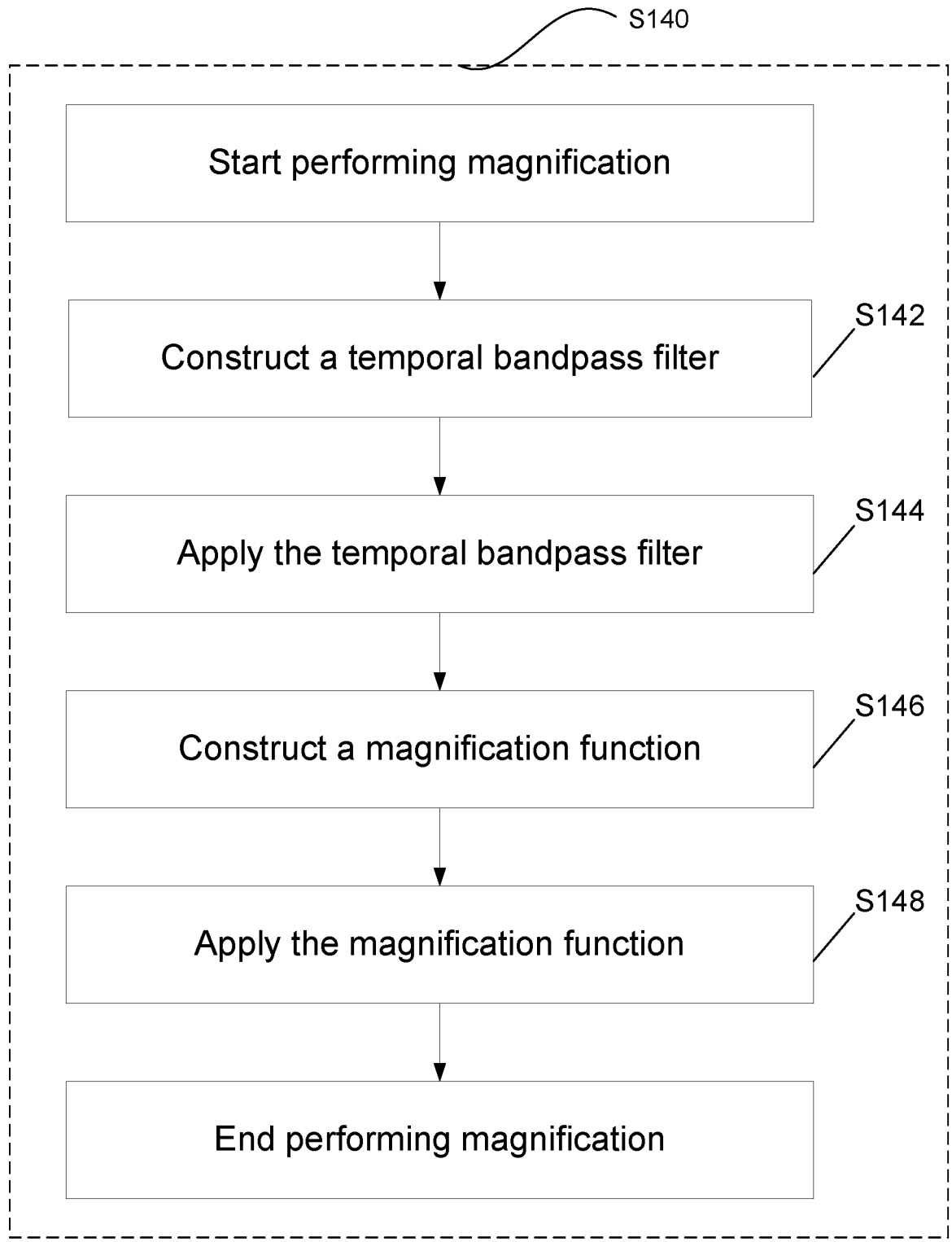
FIG. 3 is a chart flow of a magnification method to magnify small motions produced by the concealed item of the traveler, according to certain aspects of the disclosure.

FIG. 3 is a chart flow of the magnification method S140 to magnify the small motions 212 produced by the concealed item 210 of the traveler 200, according to certain aspects of the disclosure.

In a step S142, the temporal filter is constructed, or configured to target and extract the small motions 212 generated by the concealed item 210.

For example, the temporal filter may be a temporal bandpass filter constructed to focus on a relevant band of frequencies in which the small motions 212 occur. The relevant band of frequencies may be centered on a key frequency $w_k$ that captures the small motions 212 generated by the concealed item 210. For example, the key frequency $w_k$ may be the number of steps per second executed by the traveler 200.

The temporal bandpass filter may be constructed via a first first-order lowpass infinite impulse response filter with a first cutoff frequency $w_1$ and a second first-order lowpass IIR filter with a second cutoff frequency $w_2$, wherein the first cutoff frequency $w_1$ is lower than the key frequency $w_k$ and the second cutoff frequency $w_2$ is higher than the key frequency $w_k$.

The step S142 may be performed manually via the authorities 400 and/or automatically via software instructions executed by the processor 302 including processing circuitry inside the electronic control unit 300.

In a first example, the authorities 400 may manually select a type of temporal filter from the library, e.g. the temporal bandpass filter, and manually enter the parameter values corresponding to the selected type of temporal filter, e.g. the values of the first cutoff frequency $w_1$, the key frequency $w_k$, and the second cutoff frequency $w_2$, via the command/instruction interface of the electronic control unit 300.

In a second example, the software instructions may be configured to select a default type of temporal filter from the library stored in the memory 304 of the electronic control unit 300. The default type may be a temporal bandpass filter, with corresponding default parameter values, the values of the first cutoff frequency $w_1$, the key frequency $w_k$, and second cutoff frequency $w_2$. The exemplary values for the central temporal bandpass filter may be on the order of 1/10 of the frame rate Fr. The bandpass, or $w_1$ and $w_2$, may be symmetric about the central frequency and be 1/20 of the Fr.

In addition, via the software instructions, the selection of the type temporal filter and corresponding parameter values may be performed iteratively until the concealed item 210 is detected, by performing a data sweeping over the different types of temporal filter and corresponding parameters contained in the library.

In a step S144, the temporal filter constructed in the step S144 may be applied to the pixel value time series 134, via software instructions executed by the processor 302 including processing circuitry inside the electronic control unit 300, to obtain a filtered pixel value time series having the relevant band of frequencies.

In a step S146, the magnification function α is constructed to further target and amplify the small motions 212 that have been filtered in the step S144.

For example, the magnification function α may be a step function that depends on the spatial frequency of the filtered pixel value time series. The step function may be constructed with an attenuation $\alpha_a$ that forces the amplification to go from a maximum amplification $\alpha_m$ to zero when the spatial frequency exceeds a critical spatial frequency $\lambda_c$.

The step S146 may be performed manually via the authorities 400 and/or automatically via software instructions executed by the processor 302 including processing circuitry inside the electronic control unit 300.

In a first example, via the command/instruction interface of the electronic control unit 300, the authorities 400 may manually select the type of the magnification function α from the library, e.g. the step function, and manually enter the parameter values corresponding to the selected type of the magnification function α, e.g. for an a value of 1, the critical spatial frequency $\lambda_c$ may be 4 divided by the pixel dimension, and the maximum amplification factor $\alpha_m$.

In a second example, the software instructions may be configured to select a default type for the magnification function α and corresponding default parameter values from the library stored in the memory 304 of the electronic control unit 300.

In addition, via the software instructions, the selection of the type of magnification function α and corresponding parameter values may be performed iteratively until the concealed item 210 is detected by performing a data sweeping over the different types of magnification function α and corresponding parameters contained in the library.

In a step S148, the magnification function α constructed in the step S146 is applied to the filtered pixel value time series via software instructions executed by the processor 302 including processing circuitry inside the electronic control unit 300, to obtain the magnified pixel value time series 138.

In an alternative aspect of the disclosure, the magnified pixel value time series 138 obtained from the input image series 130 captured via the Eulerian frame of reference may be compared and correlated to the magnified pixel value time series 138 obtained from the input images series 130 captured via the Lagrangian frame of reference in order to better magnify the small motions 212 and better detect the concealed item 210. Translation between Eulerian and Lagrangian frames of reference can better capture a wide variety of motions: a Lagrangian frame of reference better enhances motion of sharp objects with larger amplification factors, while a Eulerian frame of reference is better at capturing smooth structures and small amplification factors.

Figure 4:
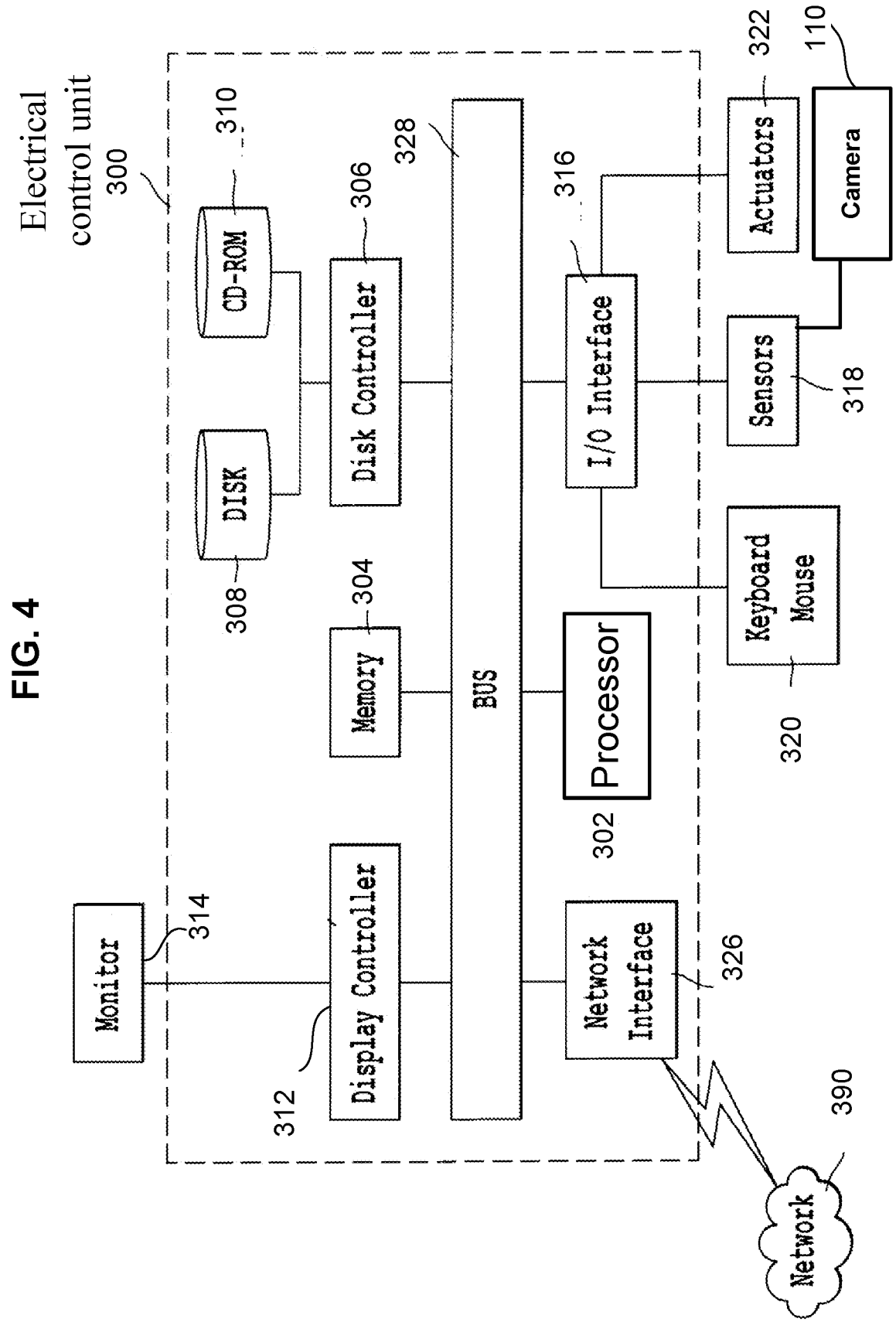
FIG. 4 is a schematic view of a hardware diagram of an electronic control unit of the security system, according to certain aspects of the disclosure.

FIG. 4 is a schematic view of a hardware diagram of the electronic control unit 300 of the security system 100, according to certain aspects of the disclosure.

FIG. 4 depicts the electronic control unit 300 to control the apparatus to process the input image series 130, to project or to output the input image series 130 to a monitor, and if necessary, to send a command to produce an alert signal 154 to the alarm system 150. As shown in FIG. 4, systems, operations, and processes in accordance with this disclosure may be implemented using a processor 302 or at least one application specific processor (ASP). The processor 302 may utilize a computer readable storage medium, such as a memory 304 (e.g., ROM, EPROM, EEPROM, flash memory, static memory, DRAM, SDRAM, and their equivalents), that is configured to control the processor 302 to perform and/or control the systems, operations, and processes of this disclosure. Other storage mediums may be controlled via a disk controller 306, which may control a hard disk drive 308 or optical disk drive 310.

The processor 302 or aspects thereof, in an alternate embodiment, may include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor 302 may be a separate device or a single processing mechanism. Further, this disclosure may benefit from the parallel processing capabilities of a multi-cored processor.

In another aspect, the results of processing in accordance with this disclosure may be displayed via a display controller 312 to the monitor 314 that may be peripheral to or part of the electronic control unit 300. Moreover, the monitor 314 may be provided with a touch-sensitive interface to a command/instruction interface. The display controller 312 may also include at least one graphic processing unit for improved computational efficiency. Additionally, the electronic control unit 300 may include an input/output interface, also referred to as an I/O interface 316, provided for inputting sensor data from sensors 318 and for outputting orders to actuators 322. The sensors 318 and actuators 322 are illustrative of any of the sensors and actuators described in this disclosure, such as the camera 110 and the alarm system 150.

Further, other input devices may be connected to an I/O interface 316 as peripherals or as part of the electronic control unit 300. For example, a keyboard or a pointing device such as a mouse 320 may control parameters of the various processes and algorithms of this disclosure. They also may be connected to the I/O interface 316 to provide additional functionality and configuration options, or to control display characteristics. Actuators 322 which may be embodied in any of the elements of the apparatuses described in this disclosure may also be connected to the I/O interface 316.

The above-noted hardware components may be coupled to the network 390, such as the Internet or a local intranet, via a network interface 326 for the transmission or reception of data, including controllable parameters to a mobile device. A central bus 328 may be provided to connect the above-noted hardware components together, and to provide at least one path for digital communication therebetween.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A method to analyze video, comprising:
   obtaining an image series in at least one of an Eulerian frame of reference and a Lagrangian frame of reference;
   for images contained in the image series, selecting one or more specific regions of interest and extracting to remove noise;
   decomposing into a plurality of spatial frequency bands, and extracting a pixel value time series corresponding to values of a pixel in each spatial frequency band;
   magnifying the pixel value time series to obtain a magnified pixel value time series;
   adding the magnified pixel value time series to the pixel value time series to generate a superimposed pixel value time series; and applying a spatial reconstruction to the superimposed pixel value time series to generate an output image series.

2. The method of claim 1, wherein magnifying the pixel value time series comprises:
providing a temporal bandpass filter to target and extract small motions in the one or more specific regions of interest;
applying the temporal bandpass filter to the pixel value time series to provide a filtered pixel value time series;
providing a magnification function to further target and amplify the small motions extracted by the temporal bandpass filter; and
applying the magnification function to the filtered pixel value time series to obtain the magnified pixel value time series.

3. The method of claim 2, wherein the temporal bandpass filter focuses on a relevant band of frequencies centered on a key frequency $w_k$, wherein the temporal bandpass filter comprises a first first-order lowpass Infinite Impulse Response (IIR) filter with a first cutoff frequency $w_1$ and a second first-order lowpass IIR filter with a second cutoff frequency $w_2$, and wherein the first cutoff frequency $w_k$ is lower than the key frequency $w_k$ and the second cutoff frequency $w_2$ is higher than the key frequency $w_k$.

4. The method of claim 1, wherein the image series comprises images of a moving object.

5. The method of claim 4, wherein the image series of the moving object is captured in an Eulerian frame of reference, and the moving object passes through a fixed field of view.

6. The method of claim 4, wherein the image series of the moving object is captured in a Lagrangian frame of reference that follows the moving object.

7. The method of claim 1, wherein obtaining the image series comprises capturing the image series with a camera.

8. The method of claim 1, further comprising analyzing a video of a moving object to magnify small motions generated by the moving object.

9. The method of claim 1, wherein the image series is at a frame rate of 400 Hz.

10. A system to analyze video, comprising:
an image collection device configured to capture an image series in at least one of an Eulerian frame of reference and a Lagrangian frame of reference;
an electronic control unit comprising processing circuitry configured, for images contained in the image series, to:
select a specific region of interest and extract to remove irrelevant noise;
decompose into a plurality of spatial frequency bands, and extract a pixel value time series corresponding to values of a pixel in each spatial frequency band;
magnify the pixel value time series to obtain a magnified pixel value time series;
add the magnified pixel value time series to the pixel value time series to generate a superimposed pixel value time series; and
apply a spatial reconstruction to the superimposed pixel value time series to generate an output image series.

11. The system of claim 10, wherein the system further comprises:
a temporal bandpass filter configured to target and extract small motions in the specific region of interest, the temporal bandpass filter being applied to the pixel value time series to provide a filtered pixel value time series;
a magnification function configured to further target and amplify the small motions extracted by the temporal bandpass filter, the magnification function being applied to the filtered pixel value time series.

12. The system of claim 11, wherein the temporal bandpass filter is configured to focus on a relevant band of frequencies centered on a key frequency $w_k$, and the temporal bandpass filter comprises a first first-order lowpass Infinite Impulse Response (IIR) filter with a first cutoff frequency $w_1$ and a second first-order lowpass IIR filter with a second cutoff frequency $w_2$, and wherein the first cutoff frequency $w_1$ is lower than the key frequency $w_k$ and the second cutoff frequency $w_2$ is higher than the key frequency $w_k$.

13. The system of claim 10, wherein the image collection device is a camera configured to capture the image series of a moving object in an Eulerian frame of reference, wherein the moving object passes through a fixed field of view of the camera.

14. The system of claim 10, wherein the image collection device is a camera configured to capture the image series of a moving object in a Lagrangian frame of reference, with a field of view that follows the moving object.

* * * * *